July 30, 1946. H. OXSEN 2,404,921
ADJUSTABLE PROPELLER SHAFT BEARINGS
Filed Nov. 29, 1943
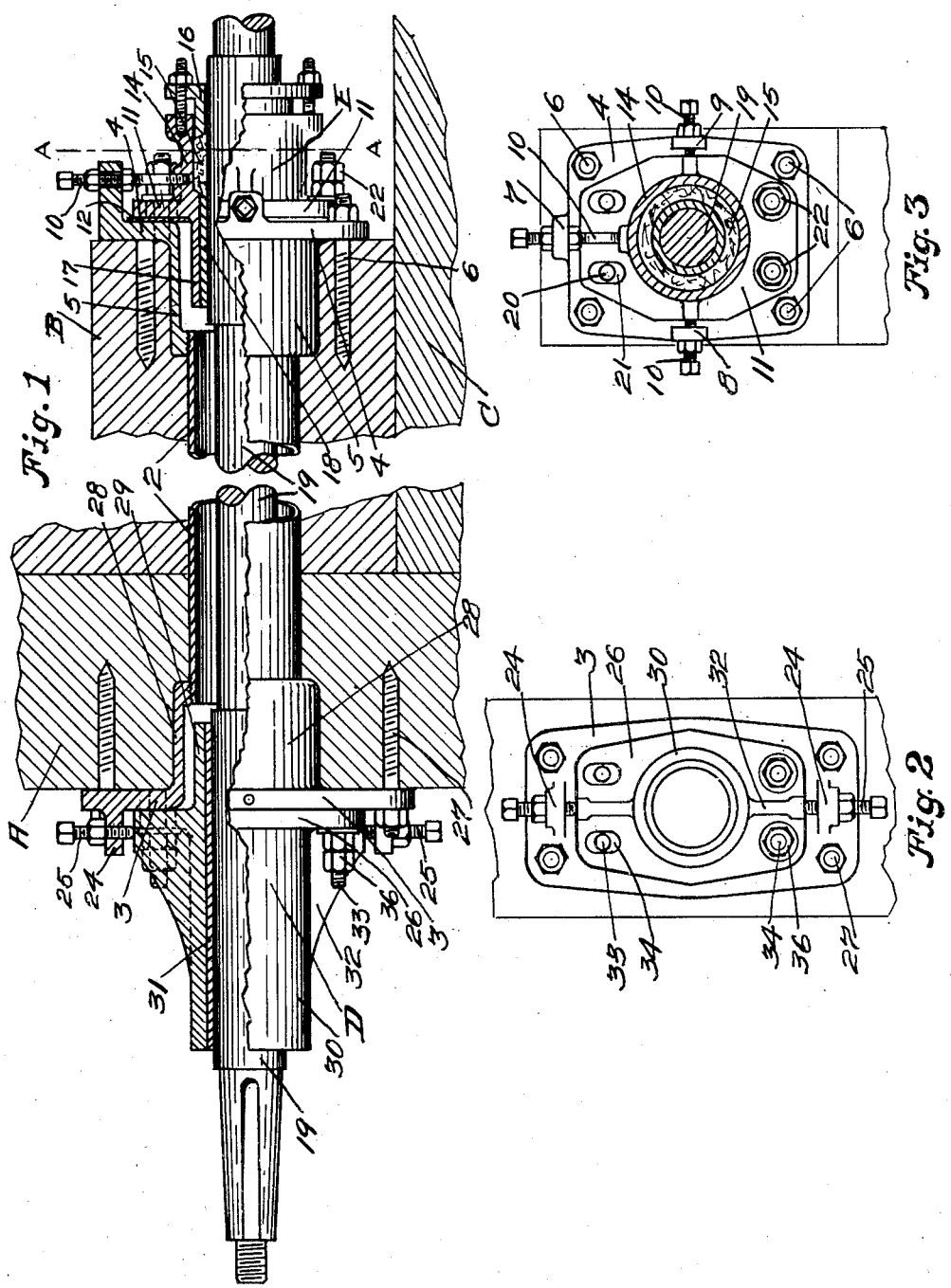
INVENTOR
Howard Oxsen
BY
Castberg Roemer
ATTORNEYS.

Patented July 30, 1946

2,404,921

UNITED STATES PATENT OFFICE 2,404,921

ADJUSTABLE PROPELLER SHAFT BEARING

Howard Oxsen, Berkeley, Calif.

Application November 29, 1943, Serial No. 512,207

3 Claims. (Cl. 308—59)

This invention relates to adjustable propeller shaft bearings. In wooden vessels which are driven by a propeller, the propeller shaft extends through the shaft log and stern post of the vessel and two bearings are usually provided to support the shaft, to wit, a stern bearing which is secured to the outer side of the stern post, and a combined stuffing box and bearing which is secured to the inner end of the shaft log. These bearings are usually rigidly secured and fixed with relation to the stern post and shaft log; hence, when the engine which drives the shaft and propeller is installed, it must be carefully and accurately lined up in order to prevent undue friction or binding of the shaft in the bearings.

After a new vessel goes into service, the hull tends to change shape due to various causes—such as the overhanging weight of the stern, unequal distribution of weights within the hull, action of waves at sea, accidental collisions, uneven expansion of wetted planking, etc., any one or more of which result in the engine becoming out of alignment with the propeller shaft and bearings, and unless realignment is immediately taken care of, damage to the bearings or shaft breakage results.

The necessity of periodic realigning of the propelling engine to meet changing conditions of hull shape continues for the full useful life of the vessel, and where the propeller shaft bearings are fixed, as previously described, there is no alternative but to move the propelling engine as the hull shape changes dictate. The moving of a propelling engine, usually a vertical shift of position, often necessitates changing of engine piping, foundation bolts, controls, etc., and where a forward power take-off arrangement is used, this must also be changed. All of these changes require considerable time and expense.

The object of the present invention is generally to improve and simplify the construction and operation of bearings of the character described, and in particular, to provide bearings which are both vertically and laterally adjustable to such an extent that realignment of the propeller shaft and bearings may be readily and quickly made whenever required without disturbing the setting of the engine or any piping, controls, etc., connected therewith.

The invention is shown by way of illustration in the accompanying drawing, in which:

Fig. 1 is a side elevation of the propeller shaft together with its bearings, said view showing the stern post, shaft log and part of the keel in section and also a portion of the bearings and their retainers in section;

Fig. 2 is an end view of the stern bearing; and

Fig. 3 is a cross section taken on line A—A of Fig. 1.

Referring to the drawing in detail, and particularly Fig. 1, A indicates a stern post, B the shaft log, and C a portion of the keel of the vessel. The shaft log and stern post are bored out in the usual manner to receive a shaft tube 2, and each end is enlarged to receive a bearing retainer. There are two bearing retainers, one indicated at 3 which forms a support for a stern bearing generally indicated at D, and a second generally indicated at 4 which forms a support for a combination stuffing box and bearing generally indicated at E.

The bearing retainer 4 consists of a substantially square-shaped plate on the inner face of which is formed a sleeve 5 which extends into and fits the inner enlarged end of the shaft log bore. The inner end of this sleeve is threaded and thereby forms a threaded connection with a shaft log tube 2. Four bolt holes are formed in the plate 4 to receive bolts 6 whereby the bearing retainer as a whole is rigidly secured to the inner end of the shaft log. The bearing retainer is otherwise provided with three lugs, generally indicated at 7, 8 and 9. Each lug carries a jack or adjusting screw 10 which permits both vertical and lateral adjustment of the bearing and stuffing box D with relation to the bearing retainer.

The combination stuffing box and bearing D comprises a plate 11 which seats on a gasket 12. A stuffing box 14 containing packing 15 is formed on one side of the plate 11 and this carries a packing gland 16 whereby the packing material is compressed and retained. The other side of the plate 11 is provided with bearing sleeve 17, and this may be provided with any suitable type of bushing 18 to form a bearing for the propeller shaft 19 extending therethrough. Four stud bolts such as shown at 20 are secured in the outer face of the bearing retaining plate 4, and these project through elongated slots 21 formed in the plate 11. These slots permit vertical adjustment of the bearing member E with relation to the retainer 4, and as the slots are wider than the bolts 20 passing therethrough, lateral adjustment is also permitted, and after adjustment has been made, nuts 22 are applied to the bolts 20 and the bearing member E may thus be rigidly secured with relation to the retainer. If at any time readjustment is required, the nuts 22 are slacked off and the bearing is again adjusted vertically or laterally or both by means of the jack screws 10, after which the nuts 22 are again tightened to rigidly secure the bearing to the bearing retainer.

The bearing retainer 3 secured to the outer side of the stern post A is elongated in shape as shown in Fig. 2. Two lugs are provided at the upper and lower ends thereof as indicated at 24. A jack screw 25 is carried by each lug, and these engage the plate 26 of which the stern bearing forms a part. The retainer 3 is rigidly secured to the stern post by bolts 27, and it is otherwise provided with an inwardly projecting sleeve 28 which is threaded at its inner end to receive the shaft tube 2. The plate 26 has a sleeve 29 formed on its inner surface and a sleeve 30 formed on its outer surface. These sleeves carry a bushing 31 of any suitable character, and this in turn forms a bearing for the propeller shaft 19. The sleeve 30 may be reenforced as indicated at 32. The bearing retainer 3 is provided with four stud bolts 33. These extend through elongated slots 34 formed in the plate 26 of the stern bearing, and as the slots are wider than the bolts, both vertical and lateral adjustment of the stern bearing with relation to its retainer 3 is assured, and after adjustment, the stern bearing is rigidly secured to its retainer by the application of nuts 36. Under ordinary conditions the stern bearing seldom requires adjustment except in a vertical direction—hence, the application of jack screws 25—but if lateral adjustment is required, it is taken care of by widening the slots 34.

From the foregoing it will be seen that as changes take place in the shape of the hull, realignment of the propelling engine becomes entirely unnecessary as vertical and lateral adjustment of the bearing E with relation to its retainer 4 will usually take care of such changes. This adjustment is quickly and readily accomplished and can thus be taken care of immediately as conditions may demand, thereby avoiding shaft breakage and bearing trouble. If hull changes are excessive, it may become necessary to also adjust the stern bearing with relation to its retainer, and as this is also vertically and laterally adjustable, such changes can be taken care of.

While the drawing and description have been directed to bearings mounted in a wooden structure, it is obvious that it is equally applicable to hulls of steel construction as the bearing retainers can either be bolted or welded to the steel structure of the vessel. It is also applicable to single shaft or twin shaft propulsion. Lubrication of the bearings may be taken care of by water circulation or otherwise, but as this forms no part of the present invention, reference thereto has been eliminated. While these and other features of the invention have been more or less specifically described and illustrated, I nevertheless wish it understood that changes may be resorted to within the scope of the appended claims, and that the materials and finish of the several parts employed may be such as the experience and judgment of the manufacturer may dictate, or varying uses may demand.

Having thus described my invention, what I claim and desire to secure by Letters Patent is:

1. The combination with the stern structure of a vessel of a pair of bearing retainers rigidly secured to the stern structure one on the exterior side of said structure and one on the inner side, a stern bearing supported by the exterior bearing retainer, a combination bearing and stuffing box supported by the inner bearing retainer, a propeller shaft extending through the bearing retainers and the bearings supported thereby, means for independently adjusting each bearing both vertically and laterally with relation to its bearing retainer, and means for forming a fluid tight seal between each bearing and its retainer.

2. In a structure of the character described, a stationary rigidly secured bearing retainer, said retainer comprising a plate having an opening formed therein, a shaft extending through the opening in the plate, a bearing surrounding the shaft, an annular flange formed on the bearing and engaging the plate to form a fluid tight joint between the bearing and plate, means for radially adjusting the bearing and shaft with relation to the opening in the plate and other means securing the bearing to the plate when adjusted.

3. In a structure of the character described, a stationary rigidly secured bearing retainer, said retainer comprising a plate having an opening formed therein, a shaft extending through the opening in the plate, a bearing surrounding the shaft, an annular flange formed on the bearing and engaging the plate to form a fluid tight joint between the bearing and plate, means for radially adjusting the bearing and shaft with relation to the opening in the plate, other means securing the bearing to the plate when adjusted, and a stuffing box at one end of the bearing to prevent leakage between the shaft and bearing.

HOWARD OXSEN.